Figure 1A:
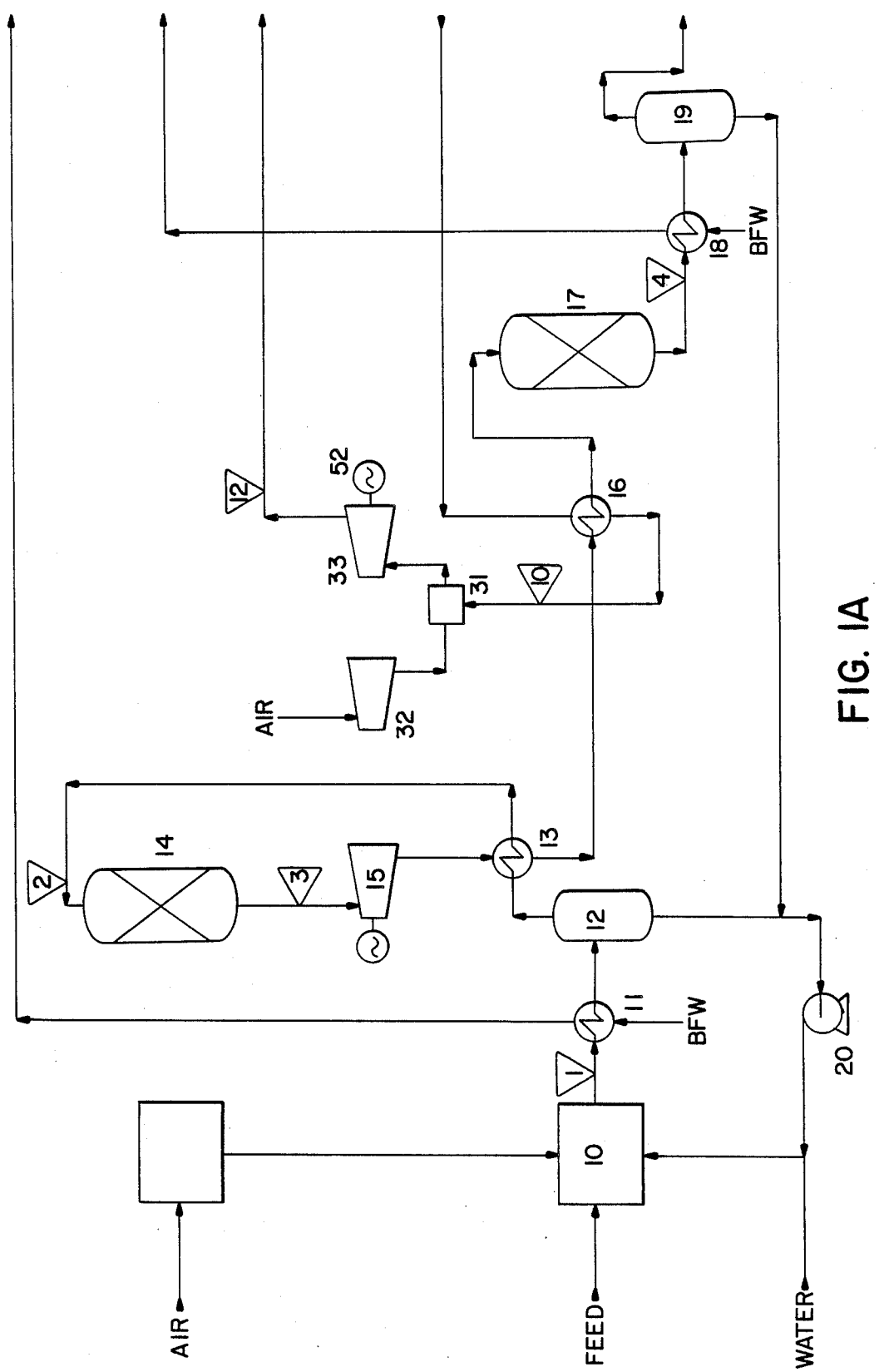

United States Patent [19]

Nurse

[11] Patent Number: 4,881,366

[45] Date of Patent: Nov. 21, 1989

[54] CLEAN ELECTRIC POWER GENERATION PROCESS

[75] Inventor: Trevor W. Nurse, Herts, United Kingdom

[73] Assignee: Humphreys & Glasgow Ltd., London, England

[21] Appl. No.: 309,966

[22] Filed: Feb. 13, 1989

Related U.S. Application Data

[63] Continuation of Ser. No. 90,094, Aug. 27, 1987, abandoned.

[30] Foreign Application Priority Data

Aug. 29, 1986 [GB] United Kingdom ............... 8620919
Nov. 27, 1986 [GB] United Kingdom ............... 8628429

[51] Int. Cl.⁴ .................................................. F02C 3/28
[52] U.S. Cl. ...................................... 60/39.07; 60/39.12
[58] Field of Search ................ 60/39.02, 39.07, 39.12, 60/39.464, 39.182

[56] References Cited

U.S. PATENT DOCUMENTS

| | | | |
|---|---|---|---|
| 2,592,749 | 4/1952 | Sedille et al. | 60/39.12 |
| 2,992,906 | 7/1961 | Guptill, Jr. | |
| 3,704,587 | 12/1972 | Krieb et al. | 60/39.12 |
| 3,720,625 | 3/1973 | Kapp et al. | |
| 3,868,817 | 3/1975 | Marion et al. | 60/39.12 |
| 4,074,981 | 2/1978 | Slater | |
| 4,095,419 | 6/1978 | Pfenninger | 60/39.12 |
| 4,193,250 | 3/1980 | Muenger et al. | 60/39.12 |
| 4,202,167 | 5/1980 | Suggitt et al. | |
| 4,261,167 | 4/1981 | Paull et al. | 60/39.12 |

FOREIGN PATENT DOCUMENTS 0009524 4/1980 European Pat. Off.
250478 6/1948 Switzerland .

Primary Examiner—Louis J. Casaregola
Attorney, Agent, or Firm—Bacon & Thomas

[57] ABSTRACT

A process is disclosed for the production of power, particularly in the form of electricity from a carbonaceous fuel which comprises partially oxidizing the fuel with oxygen or an oxygen-containing gas to yield a gas stream containing carbon monoxide at supra-atmospheric pressure, expanding the said gas stream to produce power, and substantially completely combusting at least a major portion of the expanded stream with additional oxygen or an oxygen-containing gas to produce additional power, characterized in that, prior to expansion, the said gas stream is subjected to a carbon monoxide shift reaction whereby at least some of the carbon monoxide therein is converted into carbon dioxide and hydrogen, and in that at least some of the heat of such shift reaction is used to preheat the gas stream prior to expansion. By using the process, greatly reduced emissions of nitrogen oxides can be achieved which will help reduce acid rain.

5 Claims, 2 Drawing Sheets

CLEAN ELECTRIC POWER GENERATION PROCESS

This application is a continuation of application Ser. No. 090,094, filed Aug. 27, 1987 (abandoned).

This invention relates to a process for the production of power, particularly electric power, from a carbonaceous fuel using partial oxidation of that fuel.

The present invention provides a process for the production of power from a carbonaceous fuel which comprises partially oxidising the fuel with oxygen or an oxygen-containing gas to yield a gas stream containing carbon monoxide at supra-atmospheric pressure, expanding the said gas stream to produce power, and substantially completely combusting at least a major portion of the expanded stream with additional oxygen or an oxygen-containing gas to produce additional power, characterized in that, prior to expansion, the said gas stream is subjected to a carbon monoxide shift reaction whereby at least some of the carbon monoxide therein is converted into carbon dioxide and hydrogen, and in that at least some of the heat of such shift reaction is used to preheat the gas stream prior to expansion.

Optionally: the gas stream from the partial oxidation reactor is quenched with water prior to the shift reaction step, at least some of the steam required for the shift reaction step being derived from evaporation of the quench water: the temperature of the gas stream after the shift reaction is increased prior to expansion: the reacted and expanded stream is processed to remove sulphur compounds before utilising at least a part of the stream as fuel to produce electricity.

Several power-producing processes are known which are based on the partial oxidation of a carbonaceous fuel and in which there is mention of reacting carbon monoxide and steam to produce carbon dioxide and hydrogen. This reaction, often known as the water-gas shift reaction, the shift reaction, shift or shifting, is well known in synthesis gas production where an increase in the amount of hydrogen relative to carbon monoxide is desirable, even when the concomitant increase in carbon dioxide is not.

EP-A-9524 discloses such a process but in this case carbon dioxide is an impurity which must be removed.

In U.S. Pat. No. 4,074,981 (Column 2 line 29 et seq.) the various uses of gas produced by their invention are described. For synthesis gas, hydrogen and carbon monoxide are maximised, implying that carbon dioxide is minimised. For use as a reducing gas, carbon dioxide is stated to be minimised. For use as a fuel gas having a high heating value, hydrogen, carbon monoxide and methane are maximised, again implying carbon dioxide is minimised.

U.S. Pat. No. 4,202,167 discloses a process in which the carbon dioxide generated by the shift reaction is used, but there is no recognition of the power recovery that is possible by expanding the raw gas after shift and before their final combustion.

Swiss Pat. No. 250478 discloses the use of an expander between a gas generator and the combustion chamber of a gas turbine.

U.S. Pat. No. 3,720,625 discloses a process for the production of hydrogen and/or ammonia, and gives the conventional use of the shift reaction.

In this present invention, the carbonaceous fuel may be gasified by partial oxidation at pressure by a number of methods well known to those versed in the art (e.g.

U.S. Pat. No. 2,992,906). These methods normally involve gasifying the carbonaceous fuel with an oxygen-containing gas e.g. air, or preferably with a substantially pure oxygen stream. Temperatures of the order of 1000° C. to 1600° C. are reached. The pressure of this partial oxidation may be in the range of 15-250 bars but is more likely to be in the range of 40-150 bars. Examples of suitable carbonaceous fuels are crude oil, coal, natural gas, naphtha, and heavy fuel oil. Lignite may also be used.

Preferably, any particulate matter contained in the hot gas stream from the partial oxidation reactor is removed prior to reacting the carbon monoxide to avoid fouling the catalyst normally used to promote the shift reaction, although a guard bed may also be used. Any conventional method can be used e.g. electrostatic precipitation, water washing, cyclones, filters, but preferably particulate matter is removed by quenching with water in a manner to wash it out. By using a quench after the partial oxidation reactor, greater flexibility is obtained regarding operating pressure of the partial oxidation reactor and, more importantly, the type of carbonaceous fuel, particularly coal, used.

The gases from the partial oxidation reactor may be cooled in a boiler and/or be quenched prior to expansion.

Since many fuels contain sulphur, a sulphur removal step is generally required. This step takes places prior to final combustion.

It is possible to remove sulphur compounds prior to the shift reactor and/or expander. However, present day sulphur removal systems work at relatively low temperatures. These temperatures mean that most of the steam, which is present after quenching the hot gases, would condense out. In order to subsequently react the carbon monoxide with steam, steam would have to be added.

In removing the sulphur compounds some carbon dioxide may also be removed, but the intent is to retain as much of the carbon dioxide initially present as is economic.

This is an important part of this present invention. The carbon dioxide contained in the gas reduces the $NO_x$ formed when the gas is burnt as fuel. Also, the expansion of the carbon dioxide produces power both when the gas is expanded after shift and when the gas is finally burnt.

Water or steam necessary for the shift reaction may arise by the addition of water or steam to the partial oxidation reactor, and/or by reaction in the partial oxidation step, and/or in a quench step following the partial oxidation step and/or by the direct addition of water or steam.

In the preferred embodiment some of the water or steam required to react with the carbon monoxide, and to remain at the end of the reaction to give the desired shift reaction equilibrium, is added as a result of evaporating quench water into the very hot gases leaving the partial oxidation reactor. This has the added advantage of cooling the hot gases from the partial oxidation reactor so as to make them more easily manageable. As regards cooling, partial or complete evaporation of the quench water may take place. However, for reasons given above, partial evaporation is preferred.

Generally, shift reaction catalysts require water to maintain their activities. Typically, the molar water to dry gas ratio on entry to the catalyst is within the range of 0.3 to 1.7. Preferably the ratio is 0.5 to 1.2. The gases are then allowed to react adiabatically. With modern catalysts, the effluent gas will closely approach the shift reaction equilibrium.

A shift catalyst may comprise iron oxide mixed with Cr oxide and promoted by 1 to 15 wt. % of an oxide of another metal, such as K, Th, U, Be, or Sb. Reaction occurs at 260° C. to 565° C. (500° C. to 1050° F.).

The expansion takes place after the shift reaction. Preferably the gases are expanded immediately after this reaction, since the heat released during the reaction raises the temperature of the gas stream and thereby makes the expansion more efficient. However, additional heating of this stream between shift and expansion steps can be effected e.g. by further partially oxidising the gases or heating in the exhaust convection heating zone of the downstream gas turbines. Alternately the heat of the shift reaction may be used indirectly to heat the gases prior to expansion.

The expanded gas stream may be used to preheat the feed to the shift reactor.

Some advantage would be gained even if the gas were cooled between shift and expansion (notwithstanding that the preferred embodiment is not to cool at all). Thus, this invention is also applicable when the shifted gas is cooled to any temperature down to 204° C. (400° F.) and more preferably, not below 330° C., before expansion.

A number of advantages arise from the use of the combination of shift reaction and expansion in a power-generating process:

(a) some of the carbonyl sulphide (COS) present is simultaneously reacted to hydrogen sulphide, in which form the sulphur may more easily be removed;

(b) the flame temperature of the gas is significantly reduced giving the very important advantage of reducing the amount of oxides of nitrogen ($NO_x$) formed, which should help to reduce acid rain;

(c) (b) above means that significantly less or even no water or steam has to be added to the stream to be burnt to lower its flame temperature in order to reduce $NO_x$ formation, which in turn can improve the life of the turbine blades; and (d) the exothermic shift reaction can usefully be used to preheat the stream prior to it being expanded.

The production of electricity can take place with the use of a gas turbine and/or may involve the use of a steam system. Steam may be raised at any suitable stage in the present process, for example in the exhaust of any gas turbines which are used.

In order to further reduce the amount of nitrogen oxides ($NO_x$) produced when the gas is finally burnt, the fuel gas may be saturated with water. Furthermore it may be heated before and/or after such saturation, or it may be heated without saturation (or the addition of water or steam) so as to present a hot fuel gas to the burners.

One embodiment of the present invention will now be described by way of example, with reference to FIG. 1 (for convenience divided into parts 1A and 1B) and Table 1. In this example, the feedstock is an emulsion of heavy crude oil and water, having a sulphur content of about 2-3% sulphur by weight.

For practical sizing of equipment, the actual plant would consist of two gas generation lines in parallel feeding three gas turbine lines in parallel, feeding into one conzone. However, for simplicity, the following example is based upon one gas generation line all the way through the plant.

The feedstock emulsion is reacted with 99.5% pure oxygen at a pressure of 70 bar in a partial oxidation unit. The resulting mixture of gases is quenched using an excess of water, i.e. not all of the water evaporates, down to the saturation condition at a pressure of 60 bar and at 244° C. The partial oxidation unit and quench is shown as item (10) on FIG. 1. This quench step is therefore a gas washing step in addition to a gas cooling step.

The gas produced after quenching is as stream 1 of Table 1. The gas is cooled to 232° C., by taking immediate advantage of its heat content to raise about 45 tonnes per hour of steam in boiler (11) which is fed with boiler feed water (BFW) at the relatively high pressure of 20 bars. Water condensed out of the cooled gas is removed in drum (12) leaving a raw gas with a steam to dry gas ratio of 1.0. The removed water is recycled by pump (20) back to the partial oxidation unit (10) as quench water. After preheating in heat exchanger (13), the gas (stream 2 of Table 1) enters a catalytic shift reactor (14) at 330° C. The shift reaction takes place adiabatically to produce a shifted gas (stream 3 of Table 1) at 508° C. and about 58 bar. The shifted gas is immediately let down through a hot gas expander (15) to about 28 bars and 396° C., thereby generating 25MW of power.

The expanded gas is close to its dew point and is then cooled in heat exchangers (13) and (16) down to 200° C. The heat removed is used to preheat the feed to shift reactor (14) and to heat the product fuel gas in exchanger (16) prior to final combustion. After heat exchanger (13) the temperature is 295° C. The cooled shifted gas then enters another catalytic reactor (17) where COS (carbonyl sulphide) is reduced to a low level to give a stream flow as stream 4 of Table 1. This step is desirable because COS is much more difficult to remove by sulphur removal processes than hydrogen sulphide, produced from it.

Further heat is recovered from the gas from reactor (17) by a waste heat boiler (18), in which about 65 tonnes per hour of 5 bar steam are raised, and condensate is removed at drum (19) at 160° C. Part of this condensate separated in drum (12) joins that produced at 232° C. upstream (separated at (19)) and is returned by the pump (20) to partial oxidation unit (10) for raw gas quenching. As there is still a substantial amount of useful heat present in the gas leaving drum (19), some heat is utilised in an exchanger (21) to drive an absorption refrigeration unit (28) dropping the temperature from 160° C. to 145° C., and some is utilised in a reboiler (22) in a sulphur removal unit (27). After further condensate removal in knock-out drum (23), the remaining useful heat of the gas stream is used for general water heating using heat exchanger (24). The stream is finally cooled to 40° C. using cooling water using heat exchanger (25), condensate being removed in drum (26).

Figure 1B:
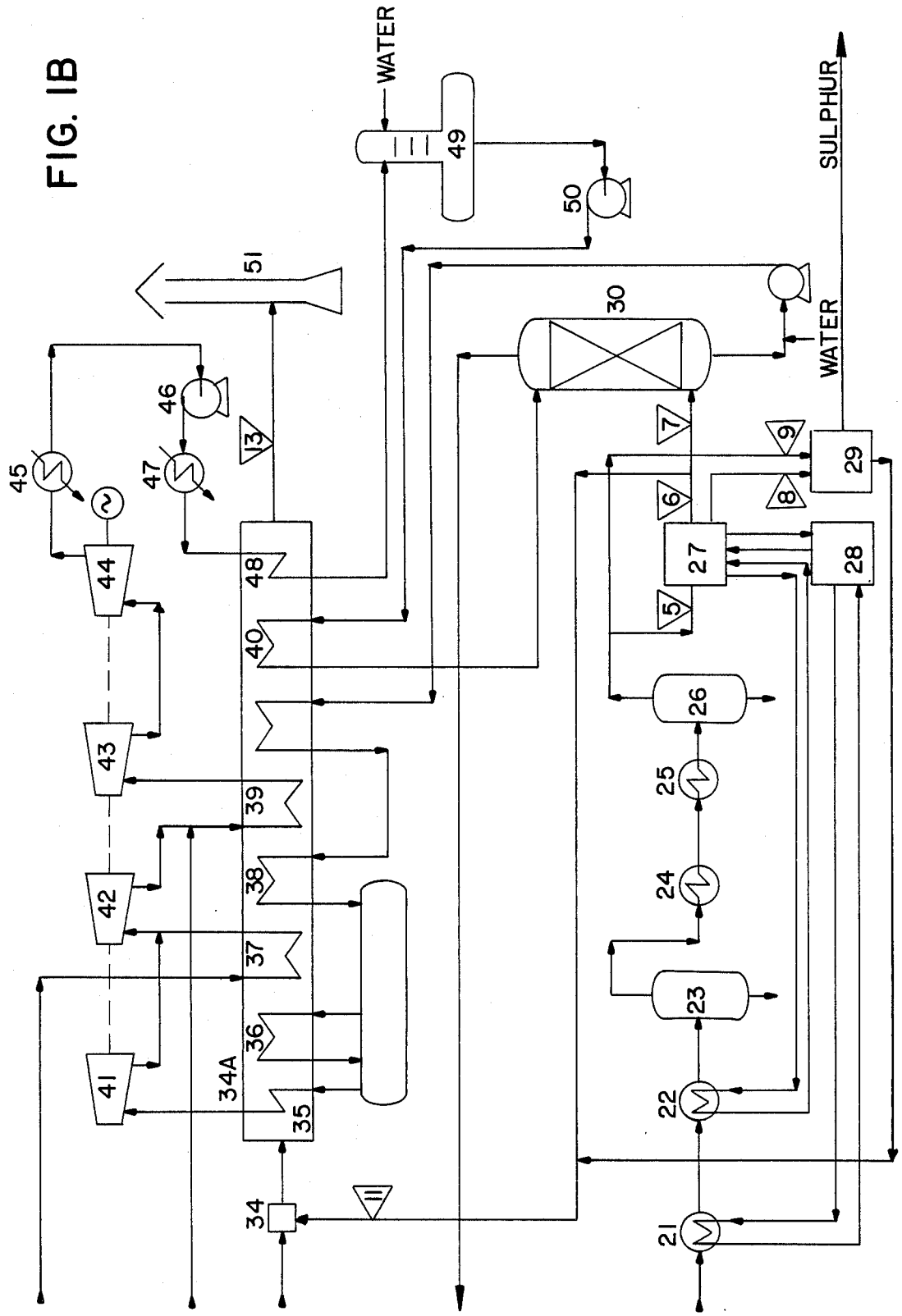

The cooled gas (stream 5 of Table 1) is now at 26 bar and contains about 32% carbon dioxide by volume, but is contaminated with about 1% of sulphur compounds, largely $H_2S$. The sulphur removal unit (27) should be capable of removing all sulphur down to less than about 50 ppm while retaining most of the carbon dioxide in the gas stream. Several selective processes are currently available, such as those known by the names, Sulphurox, Selexol, Purisol or Alkazid. In some cases, they require reboil heat for stripping the $H_2S$ from the solvent, together with refrigeration to minimise the large liquor circulation rates which are inherent in processes which use physical solvents. In FIG. 1B, a sulphur removal unit (27) is shown which uses a physical solvent. Refrigeration is supplied by the ammonia absorption unit (28), for which the necessary heat energy was taken from the gas stream in exchanger (21). Similarly, the reboil heat for solvent stripping within the sulphur removal unit is provided by exchanger (22).

The sweetgas (stream 6 of Table 1) leaves the sulphur removal unit (27) at 40° C. and 25 bar, essentially free of sulphur. After splitting off some of the gas for use as gas turbine column exhaust afterburn (stream 11 of Table 1), the balance (stream 7 of Table 1) passes into a packed saturator column (30) where it is contacted with a circulating stream of water at 150° C. The heat for this water is derived from heating coil (40) in a gas turbine (31, 32, 33) exhaust convection heating zone (conzone) (34A). Fuel gas leaves the column (30) saturated with steam at 130° C. and is further heated to 280° C. by heat recovery from the raw shifted gas in exchanger (16).

The heated fuel gas for the gas turbine is fed to the combustion chamber (31) and is burnt with air from the compressor (32) which is driven by the power turbine (33). The net power output drives an alternator (52) to produce electrical power. In this example the fuel gas fed to the gas turbine (stream 10 of Table 1) at 280° C. and 24 bars contains about 27% of carbon dioxide by volume (dry basis), 11% by volume of steam. This constitutes a highly effective gas turbine fuel because of the presence of 38% by volume inerts, mainly carbon dioxide, already at the combustion chamber pressure. This reduces the air compressor load and hence increases the net amount of power available for electricity generation. For the described embodiment of this invention, the gas turbines will give a net power of 225MW.

The exhaust gases (stream 12 of Table 1) leave the gas turbine at about 470° C. In order to make optimum use of the large amount of heat present in these gases, the temperature is first raised to 575° C. in an afterburner (34) which uses as its fuel some of the sweetgas (stream 11 of Table 1) taken off at an earlier stage. The effluent gas is then passed to the conzone (34A) where it passes over a series of heat recovery coils used in various steam raising and superheating duties. The waste heat boiler coil (36) and its associated water heater heating coil (38) have the capacity to raise about 370 tonnes per hour of steam at 100 bars. This steam is superheated in coil (35) to 500° C. and then passed to the linked steam turbines (41-44). These operate between 100 bars and condensing conditions at 0.03 bars with an intermediate reheat at 5 bars. The four turbines together generate about 157MW.

In addition, the 45 tonnes per hour of 20 bar steam raised immediately after the quench, i.e. in boiler (11), is superheated in coil (37) of the conzone (34A) to 290° C. and is passed to the turbine (42). The additional 5 bar steam raised in waste heat boiler (18) is added to the 5 bar steam and together they are reheated from about 160° C. up to 275° C. in coil (39). After the final turbine (44), wet steam (90% dryness) is condensed in a water-cooled heat exchanger (45) and the condensate pumped away by an extraction pump (46) for pre-heating to 120° C. in coils (47, 48) and returned via the deaerator (49) and recirculating pump (50) to the steam circuit. Make-up water for the stream circuit is fed in to the deaerator (49).

As mentioned previously, conzone heat recovery also includes the water heater (40) which provides hot water for the saturator column (30). Flue gases from the conzone (34A) (stream 13 of Table 1) pass from the conzone to atmosphere via a stack (51).

Referring back to the sulphur removal unit (27), the effluent stream containing the removed sulphur compounds (stream 8 of Table 1) contains about 25% (molar) of sulphur compounds and is very suitable for treatment and sulphur recovery using a Claus kiln (29). The tail gases from the Claus kiln (29) are further treated by e.g. a 'Scot' process, for this purpose, a stream of reducing gas (stream 9 of Table 1) is taken before the sulphur removal unit. The final tail gases, containing only traces of sulphur, are fed to the afterburner (34) with other residual emissions but still give rise to a stack gas sulphur level no higher than 15 parts per million.

TABLE I

MASS BALANCE

Job No.: CPG PATENT  
Client: —  
Plant: —  
Location: —  
Date: 12-Aug-87  
Issue: 1

| STREAM NUMBER | | 1 | | 2 | | 3 | | 4 | | 5 | | 6 | |
|---|---|---|---|---|---|---|---|---|---|---|---|---|---|
| STREAM NAME | | Raw Gas | | Shift Feed | | Shifted Gas | | Hydrolysed | | Sulphur Removal Feed | | Sweet Gas | |
| COMPONENTS | Mol. Wt. | kgmol/h | mol % | kgmol/h | mol % | kgmol/h | mol % | kgmol/h | mol % | kgmol/h | mol % | kgmol/h | mol % |
| Methane | 16.043 | 7.70 | 0.07 | 7.70 | 0.07 | 7.70 | 0.05 | 7.70 | 0.05 | 7.65 | 0.05 | 7.60 | 0.05 |
| Carbon Monoxide | 28.010 | 5072.60 | 46.14 | 5072.60 | 46.14 | 1417.30 | 9.67 | 1417.30 | 9.67 | 1407.63 | 9.67 | 1407.35 | 10.00 |
| Carbon Dioxide | 44.009 | 995.00 | 9.05 | 995.00 | 9.05 | 4650.30 | 31.74 | 4656.70 | 31.77 | 4624.93 | 31.77 | 4264.19 | 30.31 |
| Hydrogen | 2.016 | 4749.40 | 43.20 | 4749.40 | 43.20 | 8404.70 | 57.38 | 8404.70 | 57.36 | 8347.35 | 57.35 | 8345.68 | 59.33 |
| Nitrogen (+Ar) | 28.010 | 44.00 | 0.40 | 44.00 | 0.40 | 44.00 | 0.30 | 44.00 | 0.30 | 43.70 | 0.30 | 43.50 | 0.31 |
| H2S | 34.076 | 118.70 | 1.08 | 118.70 | 1.08 | 118.70 | 0.81 | 125.15 | 0.85 | 124.30 | 0.85 | 0.40 | .00 |
| COS | 60.070 | 6.60 | 0.06 | 6.60 | 0.06 | 6.60 | 0.05 | 0.15 | .00 | 0.14 | .00 | 0.06 | .00 |
| TOTAL - DRY | | 10994.00 | 100.00 | 10994.00 | 100.00 | 14649.30 | 100.00 | 14655.70 | 100.00 | 14555.70 | 100.00 | 14068.78 | 100.00 |
| Water | 18.015 | 14224.00 | | 10994.00 | | 7338.70 | | 7332.30 | | 54.20 | | 40.00 | |
| TOTAL - WET | | 25218.00 | | 21988.00 | | 21988.00 | | 21988.00 | | 14609.90 | | 14108.78 | |

| STREAM NUMBER | | 7 | | 8 | | 9 | | 10 | | 11 | | 12 | |
|---|---|---|---|---|---|---|---|---|---|---|---|---|---|
| STREAM NAME | | Saturator Feed | | Claus Gas | | Reducing Gas | | Gas Turbine Fuel | | Afterburn | | Gas Turbine Exhaust | |
| COMPONENTS | Mol. Wt. | kgmol/h | mol % | kgmol/h | mol % | kgmol/h | mol % | kgmol/h | mol % | kgmol/h | mol % | kgmol/h | mol % |
| Methane | 16.043 | 6.50 | 0.05 | 0.05 | 0.01 | | 0.05 | 6.50 | 0.05 | 1.10 | 0.05 | | |
| Carbon Monoxide | 28.010 | 1198.00 | 10.00 | 0.28 | 0.06 | | 9.67 | 1198.00 | 10.00 | 209.30 | 10.00 | | |
| Carbon Dioxide | 44.009 | 3629.70 | 30.31 | 360.74 | 74.08 | | 31.77 | 3629.70 | 30.31 | 634.50 | 30.31 | | |
| Hydrogen | 2.016 | 7104.00 | 59.33 | 1.67 | 0.34 | | 57.35 | 7104.00 | 59.32 | 1241.70 | 59.32 | | |
| Nitrogen (+Ar) | 28.010 | 37.00 | 0.31 | 0.20 | 0.04 | | 0.30 | 37.00 | 0.31 | 6.50 | 0.31 | 4834.50 | 5.71 |
| H2S | 34.076 | 0.34 | .00 | 123.90 | 25.45 | | 0.85 | 0.34 | | 0.06 | | | |
| COS | 60.070 | 0.05 | .00 | 0.08 | 0.02 | | 0.01 | 0.05 | | 0.01 | | | |
| SO2 | 64.070 | | | | | | | | | | | | |
| O2 | 32.000 | | | | | | | | | | | | |
| TOTAL - DRY | | 11975.59 | 100.00 | 486.92 | 100.00 | 100.00 | 100.00 | 11975.59 | 100.00 | 2093.17 | 100.00 | 66291.00 | 78.24 |
| Water | 18.015 | 34.00 | | 0.00 | | 0.30 | | 1463.10 | | 6.00 | | 0.39 | .00 |
| | | | | | | | | | | | | 13600.50 | 16.05 |
| TOTAL - WET | | 12009.59 | | 486.92 | | 100.30 | | 13438.69 | | 2099.17 | | 84726.39 | 100.00 |
| | | | | | | | | | | | | 8580.00 | |
| | | | | | | | | | | | | 93306.39 | |

| STREAM NUMBER | | 13 | |
|---|---|---|---|
| STREAM NAME | | Flue Gas | |
| COMPONENTS | Mol. Wt. | kgmol/h | mol % |
| Methane | 16.043 | | |
| Carbon Monoxide | 28.010 | | |
| Carbon Dioxide | 44.009 | 5679.00 | 6.71 |
| Hydrogen | 2.016 | | |
| Nitrogen (+Ar) | 28.010 | 66297.00 | 78.28 |
| H2S | 34.076 | | |
| COS | 60.070 | | |
| SO2 | 64.070 | 0.46 | |
| O2 | 32.000 | 12720.00 | 15.02 |
| TOTAL - DRY | | 84696.46 | 100.00 |
| Water | 18.015 | 9843.00 | |
| TOTAL - WET | | 94539.46 | |

I claim:

1. A process for the production of power from a carbonaceous fuel, which comprises partially oxidizing the fuel with oxygen or an oxygen-containing gas to yield a gas stream containing carbon monoxide at supra-atmospheric pressure, directly downstream of the oxidizing step quenching said gas stream with water, passing the quenched gas stream through a boiler in which the gas stream is cooled, thereby raising steam in the boiler, separating water from the cooled gas stream, ensuring that the gas stream is at sufficient temperature to initiate an exothermic shift reaction, and then subjecting the gas stream to a carbon monoxide shift reaction whereby at least some of the carbon monoxide is converted into carbon dioxide with a consequent evolution of heat, and directly downstream of the shift reaction expanding the gas stream to produce power, and then using at least a major portion of the expanded stream as a fuel for a gas turbine to produce additional power.

2. A process as claimed in claim 1, wherein at least some of the water or steam for said shift reaction is derived from the quenched water.

3. A process as claimed in claim 1, including a sulphur removal step.

4. A process as claimed in claim 1, wherein essentially all of the carbon monoxide and hydrogen of the expanded stream is used to produce power.

5. A process as claimed in claim 1, wherein at least some of the heat of said shift reaction is used to preheat the gas stream prior to expansion.

* * * * *